(12) United States Patent
Hayama et al.

(10) Patent No.: US 10,780,651 B2
(45) Date of Patent: Sep. 22, 2020

(54) APPLICATION DEVICE

(71) Applicant: HONDA MOTOR CO., LTD., Tokyo (JP)

(72) Inventors: Hironobu Hayama, Tochigi (JP); Takeshi Nabeta, Tochigi (JP); Takashi Motohashi, Tochigi (JP); Chikanori Watanabe, Tochigi (JP); Takashi Yamamuro, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/332,174

(22) PCT Filed: Sep. 15, 2017

(86) PCT No.: PCT/JP2017/033568
§ 371 (c)(1),
(2) Date: Mar. 11, 2019

(87) PCT Pub. No.: WO2018/056226
PCT Pub. Date: Mar. 29, 2018

(65) Prior Publication Data
US 2019/0210299 A1 Jul. 11, 2019

(30) Foreign Application Priority Data

Sep. 23, 2016 (JP) ................................. 2016-186213

(51) Int. Cl.
*B29C 65/00* (2006.01)
*B05C 11/10* (2006.01)
*B05C 5/02* (2006.01)
*B05B 1/04* (2006.01)
*B29C 45/20* (2006.01)
(Continued)

(52) U.S. Cl.
CPC ........ *B29C 66/92611* (2013.01); *B05B 1/044* (2013.01); *B05C 5/02* (2013.01); *B05C 5/0216* (2013.01); *B05C 5/0258* (2013.01); *B05C 11/10* (2013.01); *B05D 1/26* (2013.01); *B05D 7/24* (2013.01); *B29C 45/20* (2013.01); *B05B 12/00* (2013.01); *B05B 13/0431* (2013.01); *B29C 2045/238* (2013.01)

(58) Field of Classification Search
USPC .......................................................... 156/578
See application file for complete search history.

(56) References Cited

FOREIGN PATENT DOCUMENTS

JP 60-058280 4/1985
JP 01-184063 7/1989
(Continued)

OTHER PUBLICATIONS

Machine translation of JP 11-262705 (Year: 2020).*
International Search Report, dated Dec. 5, 2017, 2 pages.

*Primary Examiner* — Sing P Chan
(74) *Attorney, Agent, or Firm* — Rankin, Hill & Clark LLP

(57) ABSTRACT

An application unit (13) comprises a rotation unit (26) and a support unit (27). The rotation unit (26) comprises a nozzle unit (28), a nozzle support part (29), a body base (30), a first supply part (31), a second supply part (32), a third supply part (33), a valve (34), and a motor (35). The nozzle support part (29) rotatably supports the nozzle unit (28) such that the central axis of the nozzle unit (28) is inclined with respect to the rotation axis of the rotation unit (26).

2 Claims, 8 Drawing Sheets

(51) Int. Cl.
  *B05D 7/24*  (2006.01)
  *B05D 1/26*  (2006.01)
  *B05B 13/04*  (2006.01)
  *B05B 12/00*  (2018.01)
  *B29C 45/23*  (2006.01)
  *B05C 17/005* (2006.01)

(56) References Cited

FOREIGN PATENT DOCUMENTS

| | | |
|---|---|---|
| JP | 10-230200 | 9/1998 |
| JP | 11/262705 | 9/1999 |
| JP | 11-267560 | 10/1999 |
| JP | 11-300245 | 11/1999 |
| JP | 2001-182836 | 7/2001 |
| JP | 2011-098305 | 5/2011 |
| JP | 2015-202427 | 11/2015 |

\* cited by examiner

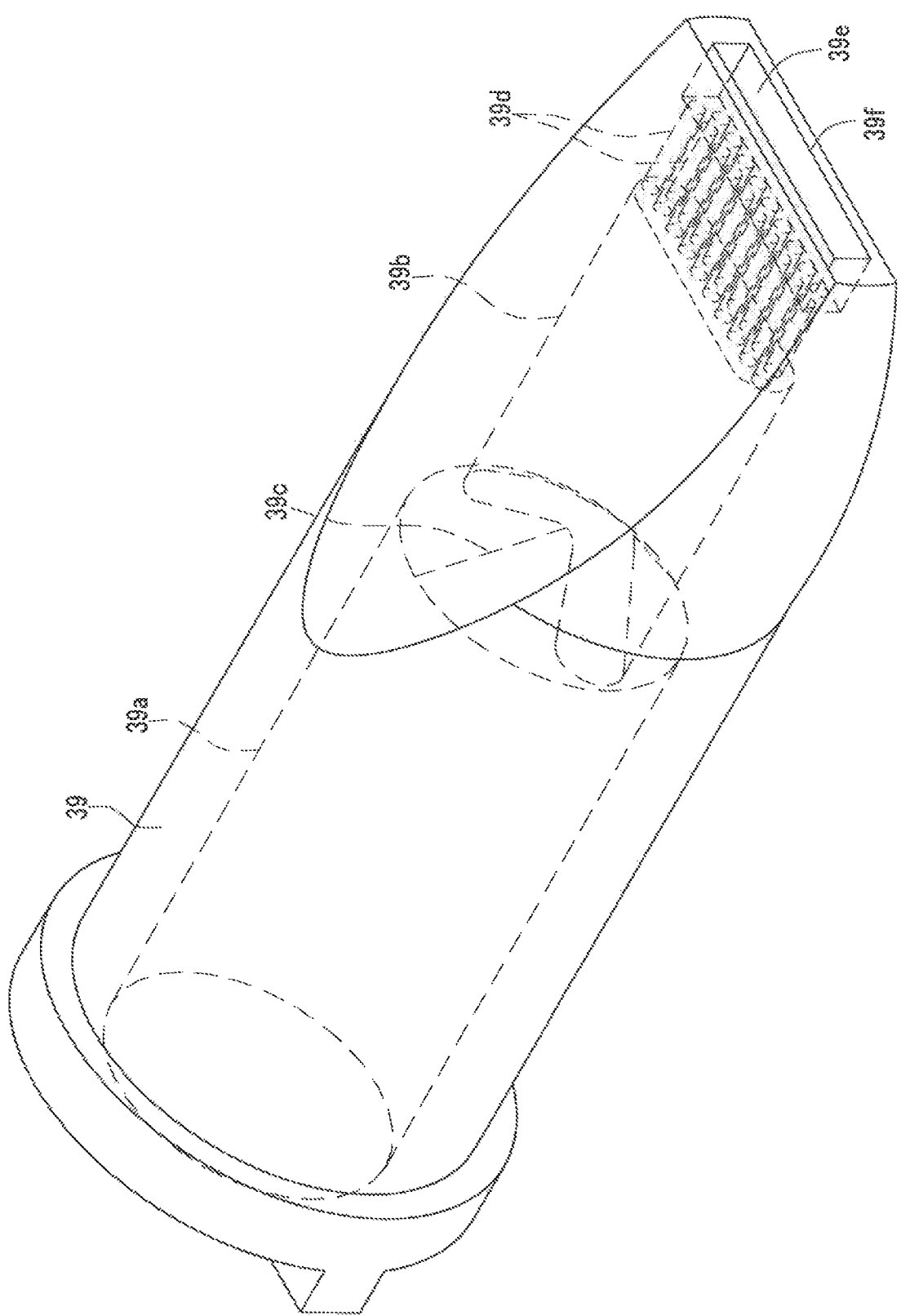

APPLICATION DEVICE

TECHNICAL FIELD

The present invention relates to an application device that applies a liquid material such as a sealing agent.

BACKGROUND ART

Two vehicle body plates may be laminated in a vehicle body plate or the like constituting a vehicle body of an automobile. In such a case, even if the accuracy of each of the vehicle body plates to be laminated falls within an allowable range, their margins of error in combination may create a gap between the end of one of the vehicle body plates and the surface of the other of the vehicle body plates. If such a gap remains unfilled, a problem arises that water leakage may occur and/or rust may be formed due to this portion, or the appearance is impaired when the rust is visually recognized in the outer appearance of the vehicle body. In view of this, rust prevention and appearance improvement are realized by applying a sealing agent to the gap.

As a device for applying a liquid material such as a sealing agent to a target object to be treated by the application device, for example, a painting robot described in Patent Literature 1 includes a first arm, a second arm connected to the first arm, and a wrist portion rotatably attached to a distal end of the second arm. A paint gun for spraying paint upon the target object to be treated by the application device is attached to the tip of the wrist portion.

CITATION LIST

Patent Literature

Patent Literature 1: Japanese Patent Application Laid-Open No. H10-230200

SUMMARY OF INVENTION

Technical Problem

In the painting robot described in Patent Literature 1, a tube for supplying the paint, a tube for supplying air, and the like are connected to the wrist portion. When the wrist portion is rotated while only a narrow space is available around the target object to be treated by the application device, a problem arises that the tubes may be brought into contact with the target object to be treated by the application device and/or any other element around the target object, making it impossible to apply the paint upon the target object to be treated by the application device.

The present invention has been made in view of the above circumstances, and an object of the present invention is to provide an application device capable of applying a liquid material even when only a narrow space is available around the target object to be treated by the application device.

Solution to Problem

An application device of the present invention comprises a main body section including a first flow path in which a liquid material flows, a rotating unit rotatably attached to the main body section and including a second flow path in which the liquid material flowing in from the first flow path flows, a nozzle attached to the rotating unit and configured to discharge the liquid material flowing in from the second flow path to apply the liquid material to an object, and a valve provided in the second flow path and configured to open and close the second flow path. The nozzle is attached to the rotating unit such that at least part of the nozzle is inclined with respect to a rotation axis of the rotating unit.

According to the present invention, the nozzle at least in part is inclined with respect to the rotation axis of the rotating unit. Consequently, even when only a narrow space is available around the target object to be treated by the application device, the rotating unit is less likely to be in contact with the target object to be treated by the application device and/or any other element around the target object when the tip of the nozzle is to be set at an application position and it is made possible to apply the liquid material upon the target object to be treated by the application device.

Also, it is preferable that the nozzle is inclined such that a tip of the nozzle and a rear end of the nozzle are separated in a parallel direction that is parallel to the rotation axis of the rotating unit, and the valve is disposed away from the rear end of the nozzle in a reverse direction opposite to the direction from the rear end of the nozzle to the tip of the nozzle in the parallel direction.

According to the above-described features, since the valve is separated from the rear end of the nozzle in the direction opposite to that of the tip of the nozzle in the parallel direction that is parallel to the rotation axis of the rotating unit, the valve does not act as an obstacle when the tip of the nozzle is to be set at an application position.

Further, it is preferable that the nozzle is attached to the rotating unit so as to be rotatable about the central axis of the nozzle.

According to the above-described features, nozzle can be oriented in a desired direction.

Advantageous Effects of Invention

According to the present invention, liquid material can be applied even when only a narrow space is available around the target object to be treated by the application device.

BRIEF DESCRIPTION OF DRAWINGS

FIG. 7 is a perspective view illustrating a nozzle body.

DESCRIPTION OF EMBODIMENTS

Embodiments of the present invention will be described hereinbelow with reference to the drawings.

Figure 1:
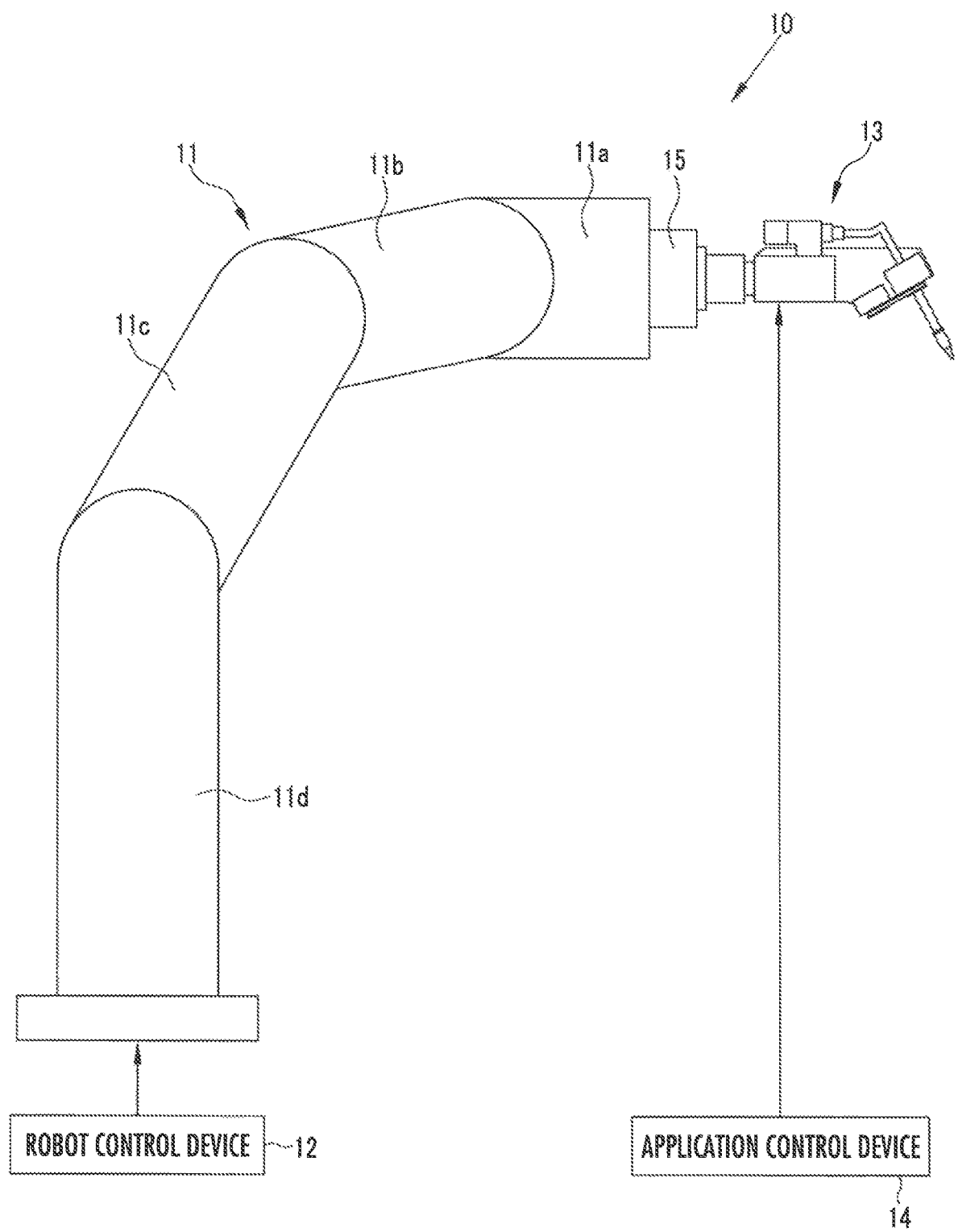
FIG. 1 is a side view illustrating an application device according to the present invention.

As illustrated in FIG. 1, an application device 10 comprises an application robot 11, a robot control device 12, an application unit 13, and an application control device 14.

The application robot 11, which is, for example, a multi-axis articulated robot, includes arms 11a to 11d in order from the tip thereof. The application robot 11 includes a plurality of motors (not shown) adapted to drive the articulations (not shown) of the arms 11a to 11d, and the driving is controlled by the robot control device 12.

A mounting section 15 is attached to the arm 11a at the distal end of the application robot 11 and the application unit 13 is mounted to the mounting section 15.

The robot control device 12 is configured to drive the motors of the application robot 11 to drive the arms 11a to 11d and move the application unit 13 mounted to the mounting section 15 until the application unit 13 reaches the position where it faces a target object to be treated by the application device.

Figure 2:
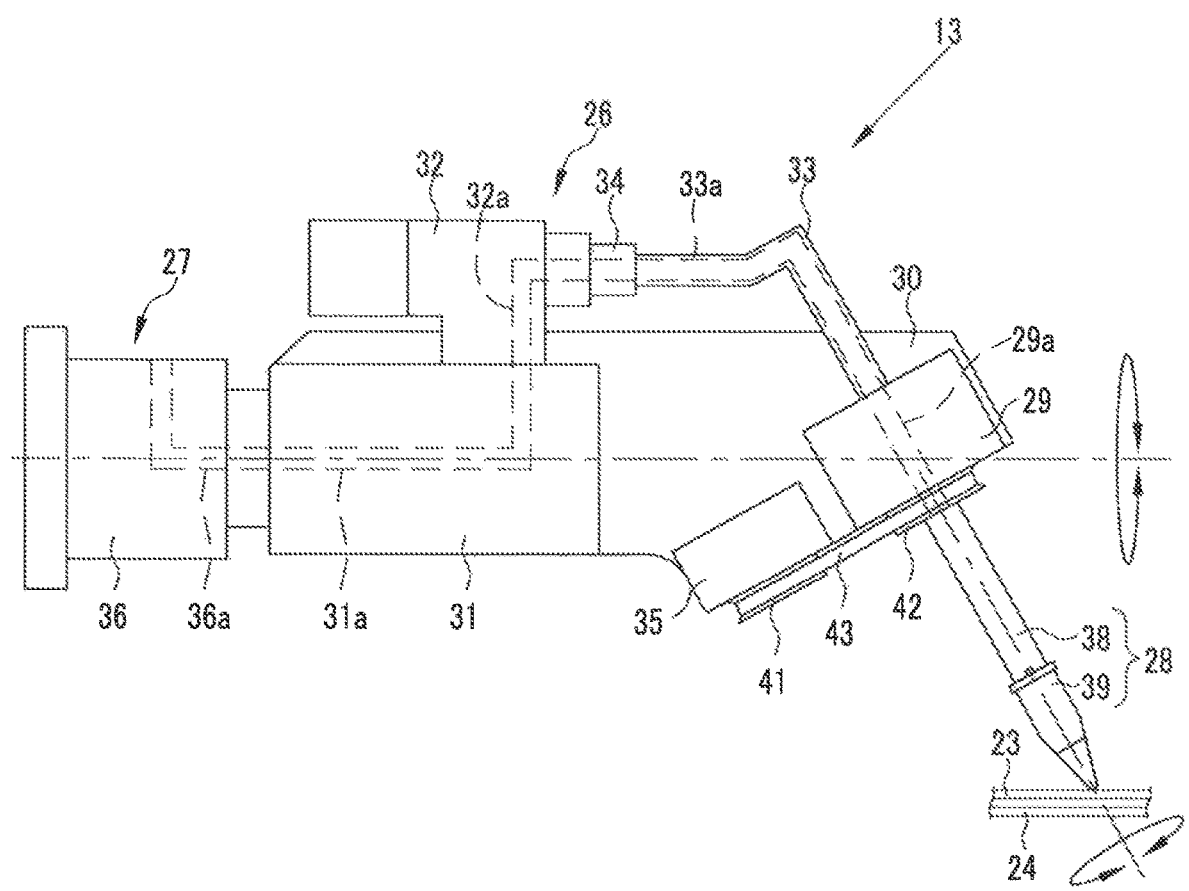
FIG. 2 is a side view illustrating an application unit.
Figure 3:
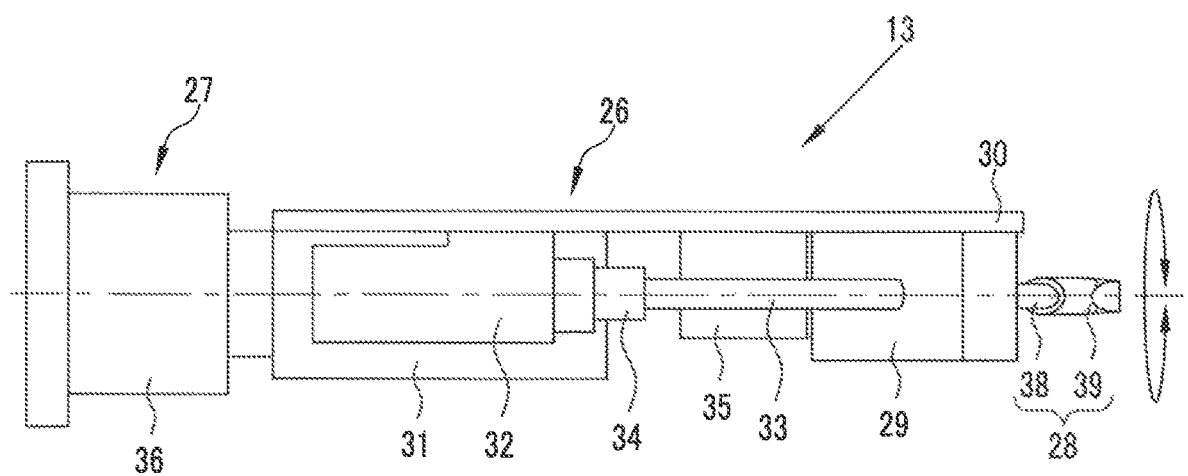
FIG. 3 is a top view illustrating the application unit.
Figure 4A:
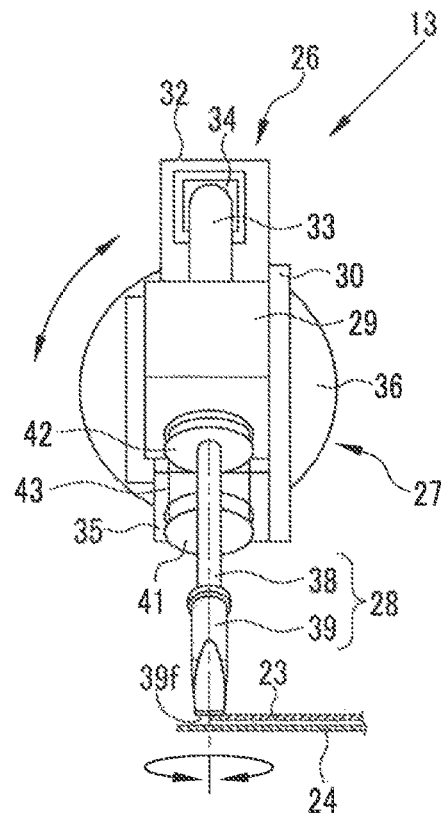
FIG. 4A is a front view illustrating the application unit.
Figure 4B:
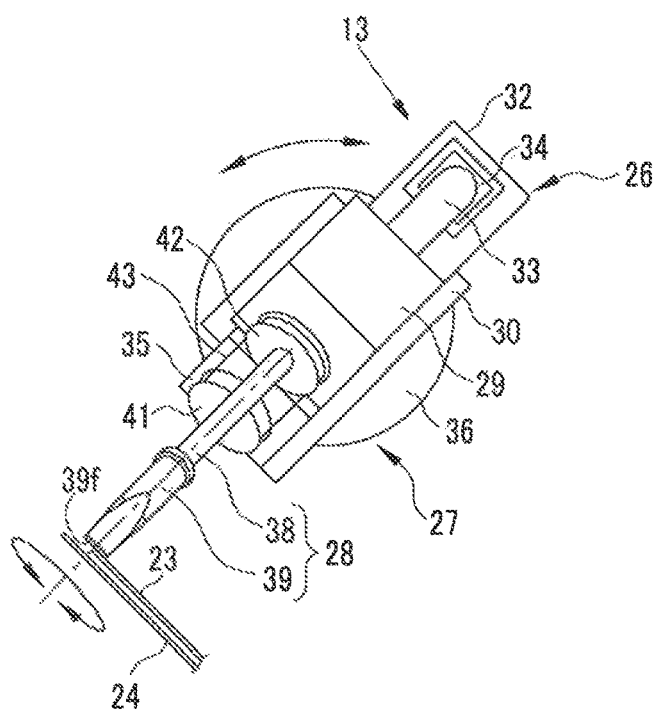
FIG. 4B is a front view illustrating the application unit in a state where a rotating unit is rotated.

As illustrated in FIGS. 2 to 4, the application unit 13 is configured to apply a sealing agent 25 (see FIG. 6) to, for example, a gap between two vehicle body plates 23, 24 constituting the vehicle body.

The application unit 13 comprises a rotation unit 26 and a support unit 27 configured to rotatably support the rotation unit 26.

The rotation unit 26 comprises a nozzle unit 28, a nozzle support part 29 configured to rotatably support the nozzle unit 28, and a body base 30. Also, the rotation unit 26 comprises a first supply part 31, a second supply part 32, and a third supply part 33 configured to supply the sealing agent 25 to the nozzle unit 28, a valve 34, and a motor 35. The nozzle support part 29, the first supply part 31, the second supply part 32, the third supply part 33, and the motor 35 are attached to the body base 30.

The support unit 27 comprises an attachment section 36 configured to be attached to the mounting section 15 of the application robot 11. The attachment section 36 rotatably supports the first supply part 31. A supply path 36a for supplying the sealing agent 25 to the nozzle unit 28 is formed in the attachment section 36.

The nozzle unit 28 is configured to discharge the sealing agent 25 and, as will be described later in detail, comprises a cylindrical nozzle cylinder 38 and a nozzle body 39 fixed to the nozzle cylinder 38.

A supply path 31a for supplying sealing agent 25 to the nozzle unit 28 is formed in the first supply part 31. The first supply part 31 is rotated by a rotation mechanism (not shown). The driving of the rotation mechanism is controlled by the application control device 14. The nozzle support part 29, the second supply part 32, the third supply part 33, and the motor 35 are attached to the body base 30 to which the first supply part 31 is attached. The rotation unit 26 is rotated by the rotation of the first supply part 31.

A supply path 32a for supplying the sealing agent 25 to the nozzle unit 28 is formed in the second supply part 32. An upstream end of the supply path 32a is connected to a downstream end of the supply path 31a.

A supply path 33a for supplying the sealing agent 25 to the nozzle unit 28 is formed in the third supply part 33. The upstream end of the supply path 33a and the downstream end of the supply path 32a are connected to the valve 34.

The valve 34, which is operable to be opened and closed, controls supply and stoppage of the supply of the sealing agent 25 through opening and closing. The driving of the valve 34 is controlled by the application control device 14.

A supply path 29a for supplying the sealing agent 25 to the nozzle unit 28 is formed in the nozzle support part 29. An upstream end of the supply path 29a is connected to the downstream end of the supply path 33a.

The nozzle support part 29 rotatably supports the nozzle unit 28 in a state where the central axis of the nozzle unit 28 is inclined with respect to the rotation axis of the rotation unit 26. In this embodiment, the nozzle unit 28 is inclined such that its tip protrudes beyond the rear end toward the front side (which corresponds to the right side in FIG. 2). It should be noted that the orientation of the inclination of the nozzle unit 28 can be modified as appropriate.

Also, the nozzle support part 29 includes a coil spring (not shown) that biases the nozzle unit 28 in the protrusion direction. The nozzle support part 29 supports the nozzle unit 28 such that the nozzle unit 28 is allowed to be moved backward when the nozzle unit 28 is pressed in the backward direction against biasing by the coil spring.

The vehicle body plates 23, 24 have a raised section that deviates from the shape defined by design. When the tip of the nozzle body 39 is pressed by the raised section, the nozzle unit 28 is moved backward against the biasing of the coil spring. As a result, damage to the nozzle unit 28 can be prevented even when the nozzle body 39 is pressed by the raised section of the vehicle body plates 23, 24. It should be noted that the coil spring may not be provided and the protrusion may be realized by the weight of the nozzle unit 28 as such.

A first pulley 41 is attached to the rotation shaft of the motor 35. A second pulley 42 is attached to the base portion of the nozzle cylinder 38. A belt 43 is wound on the first pulley 41 and the second pulley 42. The driving of the motor 35 is controlled by the application control device 14.

Rotation of the motor 35 is transmitted via the first pulley 41 and the belt 43 to the second pulley 42, and the nozzle unit 28 comprising the nozzle cylinder 38 to which the second pulley 42 is attached is rotated.

Figure 5:
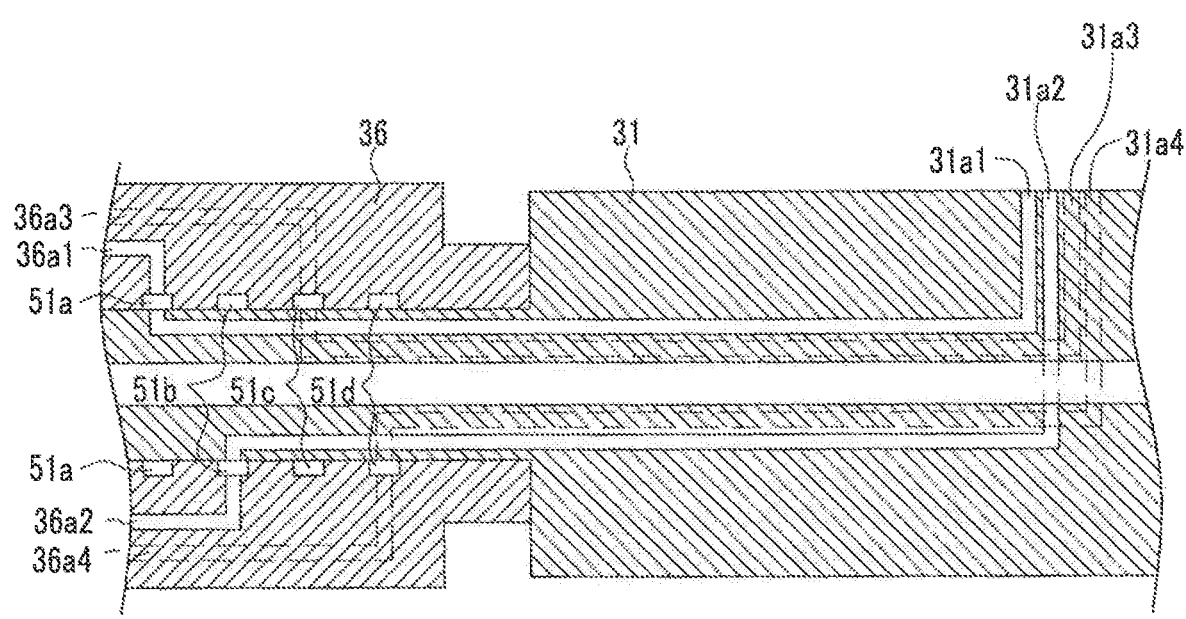
FIG. 5 is a cross-sectional view illustrating a first supply part and a mounting section.

A swivel structure of a connecting part between the supply path 31a of the first supply part 31 and the supply path 36a of the attachment section 36 will be described with reference to FIG. 5.

The attachment section 36 is formed in a cylindrical shape, in which the rear end of the first supply part 31 is rotatably inserted. Ring-shaped relay grooves 51a to 51d are formed in the inner circumferential surface of the attachment section 36. It should be rioted that an insertion hole (not shown) is formed at both sides in the front-rear direction of each of the relay grooves 51a to 51d. A sealing material (not shown) is inserted in each insertion groove.

The supply path 31a of the first supply part 31 comprises supply paths 31a1 to 31a4. The rear end (upstream end) of the supply path 31a1 is connected to the relay groove 51a. The rear ends of the supply paths 31a2 to 31a4 are connected to the relay grooves 51b to 51d. The front ends (downstream ends) of the supply paths 31a2 to 31a4 are connected to the supply path 32a of the second supply part 32.

The supply path 36a of the attachment section 36 comprises supply paths 36a1 to 36a4. The front end (downstream end) of the supply path 36a1 is connected to the relay groove 51a. The front ends of the supply paths 36a2 to 36a4 are connected to the relay grooves 51b to 51d. The rear end (upstream end) of the supply paths 36a1 to 36a4 is connected to the sealing agent supply device (not shown) for supplying the sealing agent 25. It should be noted that FIG. 2 illustrates the supply path 31a of the first supply part 31 and the supply path 36a of the attachment section 36 in a schematic manner.

When the first supply part 31 is rotated, the supply paths 31a1 to 31a4 is rotated in a state where it is connected to the relay grooves 51a to 51d. Accordingly, the sealing agent 25 that has been supplied to the attachment section 36 passes through the supply paths 36a1 to 36a4, the relay grooves 51b to 51d, and the supply paths 31a1 to 31a4 and is supplied to the supply path 32a of the second supply part 32.

As illustrated in FIGS. 7 and 8, the flow path extending through the nozzle body 39 comprises a main-body flow path section 39a, a first flow path section 39b, a connecting section 39c interconnecting the main-body flow path section 39a and the first flow path section 39b, a plurality of (e.g., 19) second flow path sections 39d, and a chamber 39e formed at the tip and configured to discharge the sealing agent 25.

An upstream end of the nozzle body 39 is formed in a circular shape and a downstream end thereof is formed in an elongated quadrilateral shape. Also, the nozzle body 37 is formed such that its shape changes from a circular shape to an elongated quadrilateral shape from the central portion toward the downstream end. It should be noted that the shape of the nozzle body 39 can be modified as appropriate and the nozzle body 39 may be formed with a circular cross section from the upstream end to the downstream end.

The main-body flow path section 39a is formed in a circular shape in the cross section in an orthogonal plane orthogonal to the direction in which the sealing agent 25 flows. The first flow path section 39b is formed with an elongated cross section, and the cross-sectional shape is smaller than that of the main-body flow path section 39a. It should be noted that the main-body flow path section 39a may not be provided and the first flow path section 39b may be extended to the upstream end of the nozzle body 39.

The connecting section 39c is formed such that its shape changes from the circular shape of the main-body flow path section 39a to the elongated shape of the first flow path section 39b toward the front end (downstream end). The chamber 39e is formed in a rectangular shape with an elongated cross section.

Figure 8A:
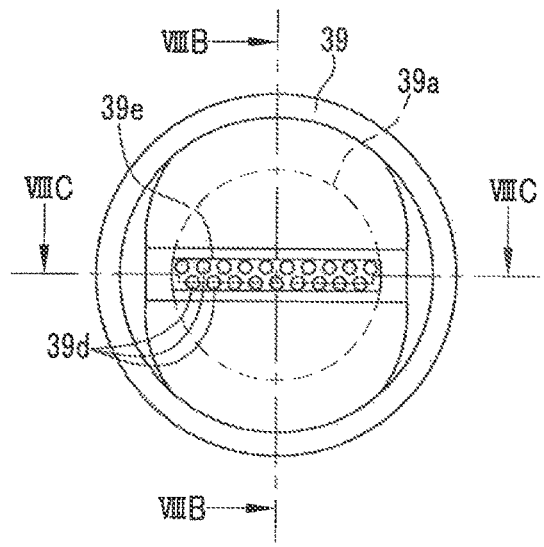
FIG. 8A is a front view viewed from the tip of the nozzle body.
Figure 8B:
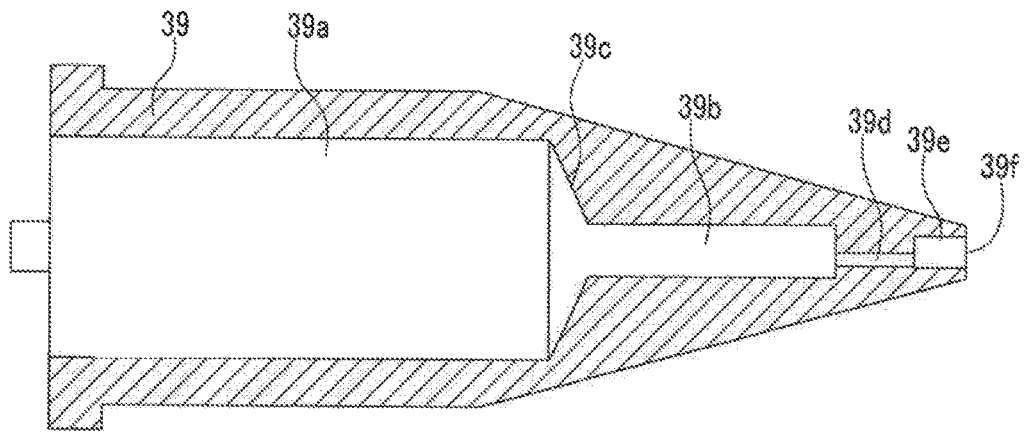
FIG. 8B is a cross-sectional view illustrating the nozzle body taken along the line VIIIB-VIIIB.
Figure 8C:
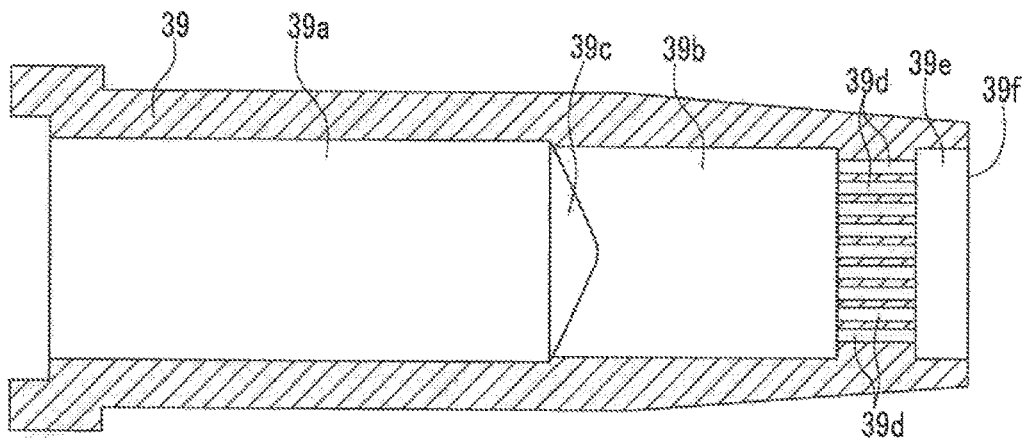
FIG. 8C is a cross-sectional view illustrating the nozzle body taken along the line VIIIC-VIIIC.

The second flow path sections 39d interconnect the first flow path section 39b and the chamber 39e. As a result, the sealing agent 25 that has been fed from the nozzle cylinder 38 passes through the main-body flow path section 39a, the first flow path section 39b, and the second flow path sections 39d and is fed to the chamber 39e. The sealing agent 25 that has been fed to the chamber 39e is discharged to the outside via the nozzle port 39f which is an opening at the front end of the chamber 39e. It should be noted that FIG. 8A is a front view viewed from the tip side of the nozzle body 37. FIG. 8B is a cross-sectional view taken along the line VIIIB-VIIIB of FIG. 8A, and FIG. 8C is a cross-sectional view taken along the line VIIIC-VIIIC of FIG. 8A.

The nozzle port 39f of the nozzle body 39 is formed in a rectangular shape and has directivity. The nozzle body 39 is configured to discharge the sealing agent 25 in a state where the nozzle body 39 is in abutment on the vehicle body plate 23. The nozzle unit 28 is set such that its central axis extends perpendicularly to the surface of the vehicle body plate 23 in its front view (FIG. 4A). It should be noted that the left-right direction in FIG. 4 corresponds to the longitudinal direction of the nozzle port 39f. Also, the central axis of the nozzle unit 28 may be inclined with respect to the surface of the vehicle body plate 23 in its front view (FIG. 4A).

Figure 6:
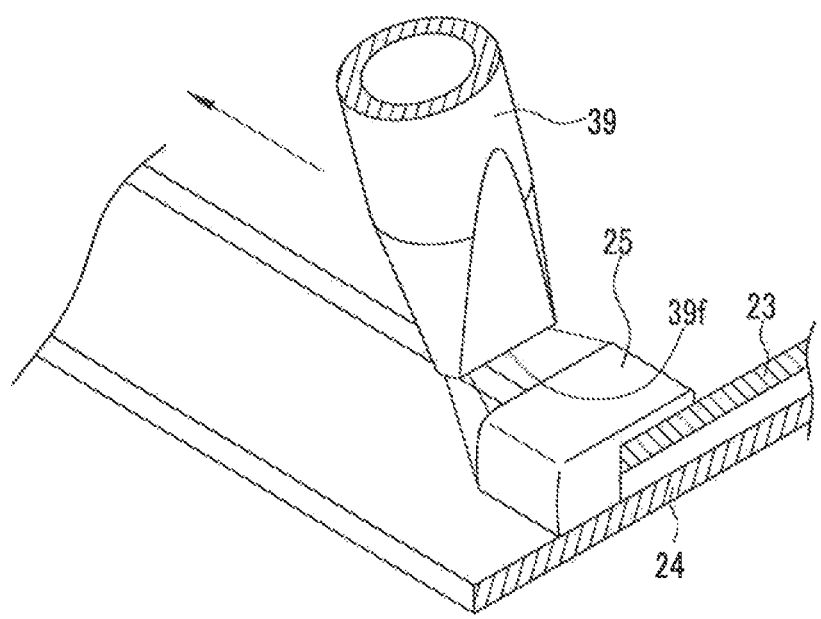
FIG. 6 is a perspective view illustrating a nozzle and vehicle body plates.

As illustrated in FIG. 6, the nozzle unit 28 is brought into abutment on the vehicle body plate 23 in a state where the nozzle port 39f is inclined with respect to the surface of the vehicle body plate 23 such that the nozzle body 39 is allowed to discharge the sealing agent 25 in a state where it is in abutment on the vehicle body plate 23. In this state, when the sealing agent 25 is discharged from the nozzle port 39f toward the stepped portions of the vehicle body plates 23, 24, then the gap between the vehicle body plates 23, 24 is filled with the discharged sealing agent 25.

When the sealing agent 25 is applied to the gap between the vehicle body plates 23, 24 by the application device 10, an operator operates an operation panel (not shown) and enters application execution data for driving the application robot 11, and the valve 34 and the motor 35 of the application unit 13. On the basis of the application execution data, the robot control device 12 drives the application robot 11 and, as illustrated in FIG. 1, sets the application unit 13 mounted to the mounting section 15 at a desired position.

Next, as illustrated in FIG. 4, the application control device 14 drives the valve 34 to place it in an open state. Also, the application control device 14 drives the rotation mechanism to rotate the first supply part 31, and causes the rotation unit 26 to rotate until it reaches the desired orientation. Further, the application control device 14 drives the motor 35 of the nozzle unit 28 to cause the nozzle unit 28 to rotate until it reaches the desired orientation.

It should be noted that the desired orientation of the rotation unit 26 refers to an orientation in which the central axis of the nozzle unit 28 is perpendicular to the surface of the vehicle body plate 23 in its front view (see FIG. 4A). Also, the desired position of the nozzle unit 28 refers to the position where the tip face of the nozzle unit 28 is in abutment on the end of the vehicle body plate 23. Further, the desired orientation of the nozzle unit 28 refers to an orientation in which the length direction of the nozzle port 39f of the nozzle unit 28 (the left-right direction in FIG. 4) spans over both of the vehicle body plates 23, 24 at the stepped portions of the vehicle body plates 23, 24.

When the rotation unit 26 has been set in a desired orientation and further the nozzle unit 28 has been set at a desired position and in a desired orientation, then the sealing agent supply device is driven to supply the sealing agent 25 to the attachment section 36.

The sealing agent 25 that has been supplied to the attachment section 36 passes through the supply paths 36a1 to 36a4 of the attachment section 36, the relay grooves 51b to 51d, the supply paths 31a1 to 31a of the first supply part 31, the supply path 32a of the second supply part 32, the supply path 33a of the third supply part 33, and the supply path 29a of the nozzle support part 29 and is supplied to the nozzle unit 28.

The sealing agent 25 that has been supplied to the nozzle unit 28 passes through the nozzle cylinder 38 and is fed to the nozzle body 39. In addition, as illustrated in FIG. 6, the sealing agent 25 that has been fed to the nozzle body 39 is discharged via the nozzle port 39f toward the vehicle body plates 23, 24. The gap between the vehicle body plates 23, 24 is filled with the discharged sealing agent 25.

Since the second flow path section 39d of the nozzle body 39 is smaller than the downstream end of the first flow path section 39b, the sealing agent 25 residing in the first flow path section 39b is powerfully led to the chamber 39e and discharged via the nozzle port 39f to the outside. By virtue of this, the sealing agent 25 can be discharged by substantially the same amounts over the entire range of the chamber 39e.

Since the sealing agent 25 can be discharged over the entire range of the chamber 39e with substantially the same speed, the gap between the vehicle body plates 23, 24 can be uniformly filled. In particular, a sufficient amount of the sealing agent 25 can be applied to the vehicle body plate 24 on the distal side in a state where the amount of application (amount of coating) of the sealing agent 25 to the vehicle body plate 23 on the proximal side of the nozzle body 39 is maintained at an appropriate thickness.

In this embodiment, the central axis of the nozzle unit 28 is inclined with respect to the rotation axis of the rotation unit 26. By virtue of this, the tip of the nozzle unit 28 can be placed close to the vehicle body plates 23, 24 even when only a narrow space is available around the vehicle body plates 23, 24 which are the target objects to be treated by the application device.

Also, since the valve 34 is separated from the rear end of the nozzle body 39 in the direction opposite to the tip of the nozzle body 39, the valve 34 does not become an obstacle when the tip of the nozzle unit 28 is set at an application position.

While the nozzle in the above-described embodiment discharges the sealing agent in a state where the nozzle is in abutment on the vehicle body plate, a gap may be created between the nozzle and the vehicle body plate.

Also, what is discharged from the nozzle is not limited to the sealing agent and any liquid material may be discharged therefrom.

Further, the shape of the nozzle is not limited to a linear one and may be, for example, an L shape. In this case as well, part of the nozzle is attached such that it is inclined with respect to the rotation axis of the rotating unit.

REFERENCE SIGNS LIST

10: application device; 11: application robot; 12: robot control device; 13: application unit; 14: application control device; 15: mounting section; 21: supporting section; 23, 24: vehicle body plate; 25: sealing agent; 26: rotating unit; 27: supporting unit; 28: nozzle unit; 29: nozzle support part; 30: body base; 31: first supply part; 31a to 33a, 31a1 to 31a4, 36a, 36a1 to 36a4: supply path; 32: second supply part; 33: third supply part; 34: valve; 35: motor; 36: mounting section; 38: nozzle cylinder; 39: nozzle body; 39a: main-body flow path section; 39b: first flow path section; 39c: connecting section; 39d: second flow path section; 39e: chamber; 39f nozzle port; 40: motor; 41, 42: first and second pulleys; 43: belt; 51a to 51d relay groove.

The invention claimed is:

1. An application device comprising:
   a main body section including a first flow path in which a liquid material flows;
   a rotating unit rotatably attached to the main body section and including a second flow path in which the liquid material flowing in from the first flow path flows;
   a nozzle attached to the rotating unit and configured to discharge the liquid material flowing in from the second flow path to apply the liquid material to an object; and
   a valve provided in the second flow path and configured to open and close the second flow path,
   wherein the rotating unit comprises:
      a supply part rotatably attached to the main body section;
      a nozzle support part configured to rotatably support the nozzle about a central axis of the nozzle;
      a connecting part connecting the supply part and the nozzle support part; and
      a base to which the supply part and the nozzle support part are attached, and
   the nozzle being attached to the rotating unit such that at least part of the nozzle is inclined with respect to a rotation axis of the rotating unit.

2. The application device according to claim 1, wherein the nozzle is inclined such that a tip of the nozzle and a rear end of the nozzle are separated in a parallel direction that is parallel to the rotation axis of the rotating unit, and
the valve is disposed away from the rear end of the nozzle in a reverse direction opposite to a direction from the rear end of the nozzle to the tip of the nozzle in the parallel direction.

* * * * *